United States Patent [19]

Meijers et al.

[11] Patent Number: 5,340,160

[45] Date of Patent: Aug. 23, 1994

[54] THERMOPLASTIC SADDLE IN TWO PARTS FOR REPAIRING OR RENOVATING A PIPE LINE WITH BRANCH PIPE AND REPAIRED OR RENOVATED PIPE WITH A SADDLE

[75] Inventors: Augustinus G. H. Meijers, Zwolle; Karin M. M. van Beurden, Hellendoorn, both of Netherlands

[73] Assignee: Wavin B.V., Netherlands

[21] Appl. No.: 856,962

[22] PCT Filed: Nov. 21, 1990

[86] PCT No.: PCT/NL90/00174

§ 371 Date: May 21, 1992

§ 102(e) Date: May 21, 1992

[87] PCT Pub. No.: WO91/07619

PCT Pub. Date: May 30, 1991

[30] Foreign Application Priority Data

Nov. 21, 1989 [NL] Netherlands .......................... 8902881
Jul. 17, 1990 [NL] Netherlands .......................... 9001624

[51] Int. Cl.$^5$ ............................................ F16L 55/165
[52] U.S. Cl. ................................. 285/15; 285/55; 285/155; 285/156; 285/298; 285/906
[58] Field of Search ............... 285/156, 189, 15, 157, 285/298, 302, 55, 155, 906

[56] References Cited

U.S. PATENT DOCUMENTS 3,403,929 10/1968 Russell .
4,792,493 12/1988 Bertram et al. .

FOREIGN PATENT DOCUMENTS

| 791961 | 5/1963 | Australia . |
|---|---|---|
| 2066270 | 4/1972 | Australia . |
| 7488387 | 12/1987 | Australia . |
| 2719320 | 4/1977 | Fed. Rep. of Germany . |
| 3328913 | 2/1985 | Fed. Rep. of Germany . |
| 8911617 | 12/1989 | Fed. Rep. of Germany . |
| 1588087 | 4/1970 | France . |
| 2352238 | 12/1977 | France . |
| 6703490 | 9/1968 | Netherlands . |
| 7014525 | 4/1971 | Netherlands . |
| 635181 | 4/1980 | Switzerland . |
| 2041147 | 1/1980 | United Kingdom . |
| 8204086 | 11/1982 | World Int. Prop. O. . |

OTHER PUBLICATIONS

International Search Report; Netherlands Search Report of NL 8902881 Sep. 1990 and Netherlands Search Report of NL 9001624 Nov. 1990.

Primary Examiner—Dave W. Arola
Attorney, Agent, or Firm—Wigman, Cohen, Leitner & Myers

[57] ABSTRACT

A thermoplastic saddle (6) for renovating or repairing a pipeline (1) with a branch pipe (2). The saddle comprises two saddle parts (20, 22) being movable with respect to each other. The first saddle part (20) comprises a flexible saddle plate (6') and a first connecting part (21) being integral therewith. The second saddle part (22) comprises a branch (8) provided with a second connecting part (23). The part (21) tapers towards its open free end (12') and the second connecting part has a spherical circumference (23a). The position of connecting parts (23, 23a) with respect to connecting part (21) ensures that branch (8) is retained in connecting part (21) if said branch is subjected to pulling forces. In a renovated or repaired pipeline (1) the saddle is fixed by fixing means preferably an expanded plastic fixing sleeve (13). However, fixation by a glued connection (112) and/or sealed connection (113) is also possible. The branch (8) is widened by heat so that it clampingly engages the inner wall of branch pipe (2). Sealing means may be used for sealing saddle parts and opposite lying parts. Widening of branch (8) and/or fixing sleeve (13) is performed by means of an inflatable balloon device e.g. as shown in FIG. 7.

7 Claims, 12 Drawing Sheets

_FIG:11._

_FIG:12._

THERMOPLASTIC SADDLE IN TWO PARTS FOR REPAIRING OR RENOVATING A PIPE LINE WITH BRANCH PIPE AND REPAIRED OR RENOVATED PIPE WITH A SADDLE

BACKGROUND OF THE INVENTION

The invention relates to a branch saddle of thermoplastic material suitable for use in a pipeline to be repaired or renovated, said pipeline having at least one branch pipe connected therewith through a branch pipe opening, said saddle at least comprising a saddle plate and a branch being accomodated from the inner side of the pipeline into said branch pipe and branch opening.

Such a saddle of a thermoplastic is known in the art.

It presents some disadvantages. First of all the length of the branch of the saddle must be held as small as possible in order to be able to transport the saddle through the pipeline to the position of the branch pipe. This involves the use of a branch of an unacceptable short length in case of small differences in diameter of the pipeline and the branch pipe.

Secondly the branch of the saddle is often too rigid so that it is difficult to accommodate the saddle in the right position in the branch.

Thirdly, the production of such saddles is difficult and at last, the saddle must meet close tolerances.

It is now the aim of the invention to provide a saddle overcoming these disadvantages.

This aim is attained by mean that the saddle is divided in two saddle portions comprising a saddle part and a branch part being movable with respect to each other, thus allowing transport of the saddle through the pipeline for accommodation of the saddle with a decreased projecting length of the branch in comparison with the projecting length of the branch in its final accommodated state.

By using a branch saddle designed in two parts the length of the branch can be increased as the branch is able to move towards the direction below the saddle plate.

Moreover, due to the higher flexibility of the branch with respect to the saddle plate the branch can be more easily pushed into a branch pipe.

A branch saddle according to subclaims 1 to 7 present the advantages of a good flexibility between saddle plate and branch.

Simple production and accommodation of the saddle is possible by means of a saddle having a saddle plate with an integral first conical connecting saddle part which forms a first saddle part and branch having formed thereon a second connecting part forms a second saddle part second conical connecting part being detachably accommodated in first conical connecting part and provided with means for sealingly interconnecting first connecting part and second connecting part.

Flexibility is even more improved by means of a saddle in which the second connecting part is rounded preferably spherical and the saddle portion engaging said rounded, preferably spherical part is conically narrowing towards its free end.

The invention also relates to a repaired or renovated pipeline with at least one branch pipe having a branch pipe inner wall, interconnected by means of a branch pipe opening in which an external surface of a branch saddle inserted from the inner side of the pipeline is made to mate in a sealing manner by sealing means, with the inside of an opposite-lying pipe wall and the branch of this branch saddle extends into a branch pipe while fixing means mating with a pipe wall and the pipe saddle fix the pipe saddle.

Such a renovated or repaired pipeline is known, in particular a sewer pipe in which a tubular lining is pushed from the outside and a branch saddle is pushed outwards from the inside of the pipeline through a bore in the lining. In this case the saddle is drawn from the outside against the tubular lining by means of a moving nut, fitted on an external thread of the branch of the saddle, and a shoulder element.

This known method has the great disadvantage that a pit virtually always has to be dug to form the branch connection, since it is difficult to form the branch connection in existing underground branch pipes; as generally occurs in the case of existing sewer pipes of concrete and the like.

Besides, in the event of use of such a branch connection without digging, a considerable reduction in the existing throughput from or to the existing branch pipe will occur.

Finally, in the case of the known branch connection there is no guarantee of a good seal being obtained between plastic saddle and plastic lining, so that medium such as effluent conveyed through such pipelines can penetrate into the space between tubular lining and inside of the pipeline.

Since, however, it is just such tubular linings which are fitted in sewer pipes which over the years have become damaged, this is unacceptable from the environmental point of view.

Besides, for sewer pipes lying below ground water level, the existing undesirable situation that soil particles and water wash into the pipe through leakage, with risks of sagging and undesirable strain on sewage treatment plants, is not, or is inadequately, eliminated.

SUMMARY OF THE INVENTION

The object of the invention is now to provide a pipeline of the above-mentioned type in which these disadvantages do not occur.

This object is achieved according to the invention in in that a saddle according to the invention has been fixed in said pipeline, the two parts of said saddle sealingly engaging each other.

Fixing a branch saddle by means of a widened inner fixing sleeve according to the present invention produces a very robust, very flexible connection technique. Slight variations in dimensions between the saddle and the pipeline are in fact easily overcome by the inner fixing sleeve during widening, while on the other hand a very good fixing of the branch saddle is obtained by means of a widened inner fixing sleeve. After widening of the fixing sleeve the saddle plate connects well, so that as little disturbance of flow as possible occurs. Any corrugations present in the saddle plate can be pressed away by the fixing sleeve, where a flexible saddle plate is used.

On the other hand, no major constriction in the throughput is produced, and a uniform transition to a branch pipe is possible if said branch pipe is integral with the sewer pipe.

Fitting such a saddle from the inside of the sewer pipe also means that no local excavations are necessary.

Sealing means may be advantageously made of a seal of elastic material, more particularly of an elastic material being swellable under the influence of medium, such as water, conveyed through the sewer pipe.

Through good fixing of the branch saddle, the seal of elastic material between saddle and inside of the lining can be deformed well, and in this way a perfect seal is obtained. In the above-mentioned way it is also guaranteed that no liquid medium can reach the outside of the lining or no particles or ground water from the ground around it can go into the sewer pipe.

The branch piece may be expediently enclosed on the outside by elastic material forming a seal between the outside of the branch and the inside wall of the branch pipe.

According to another preferred embodiment the outside of inner fixing sleeve and the parts of the lining mating therewith a fixing material is present, with greater hardness than the material of lining and fixing sleeve, preferably carborundum granules.

BRIEF DESCRIPTION OF THE DRAWINGS

The invention will now be explained with reference to an example of an embodiment shown by means of the drawing, in which:

FIG. 6 shows a detail of a connection according to the invention;

DETAILED DESCRIPTION OF THE INVENTION

The FIGS. 2–6 show a sewer pipe 1 with a pipe opening 2a to which a branch pipe 2 is connected. Such a sewer pipe is generally made of concrete or clay ware, or can also be made of brickwork or plastic. A plastic lining 3 is fitted in the sewer pipe 1, so that effluent conveyed through the sewer pipe can no longer escape through cracks or other damage in the sewer pipe 1, and water and particles from the environment cannot enter the sewer pipe either.

After the insertion of the lining 3, a robot is used to form a lining bore 3a at the branch pipe 2, and then also from the inside of the pipe 1 a saddle 6 of thermoplastic plastic with saddle plate 6' provided with saddle opening 6a is accommodated. The branch 8 of the saddle projecting into the branch pipe 2 is then widened, any steel barbs present on the branch may then penetrate into the wall of the branch pipe 2.

A seal 5 is then present between the inside of the branch pipe 2 and the outside of the branch 8.

A robot then fits a thin fixing sleeve 13 of thermoplastic plastic with a diameter which is smaller than the internal diameter of lining 3 and saddle 6 at the saddle, this inner fixing sleeve 13 having or being provided with an inner fixing sleeve opening 13a corresponding to the saddle opening 6a of saddle 6. Before widening, the inner fixing sleeve opening 13a is oval, but it becomes a round inner fixing sleeve opening during widening. However, the sleeve opening may also be circular.

Figure 4:
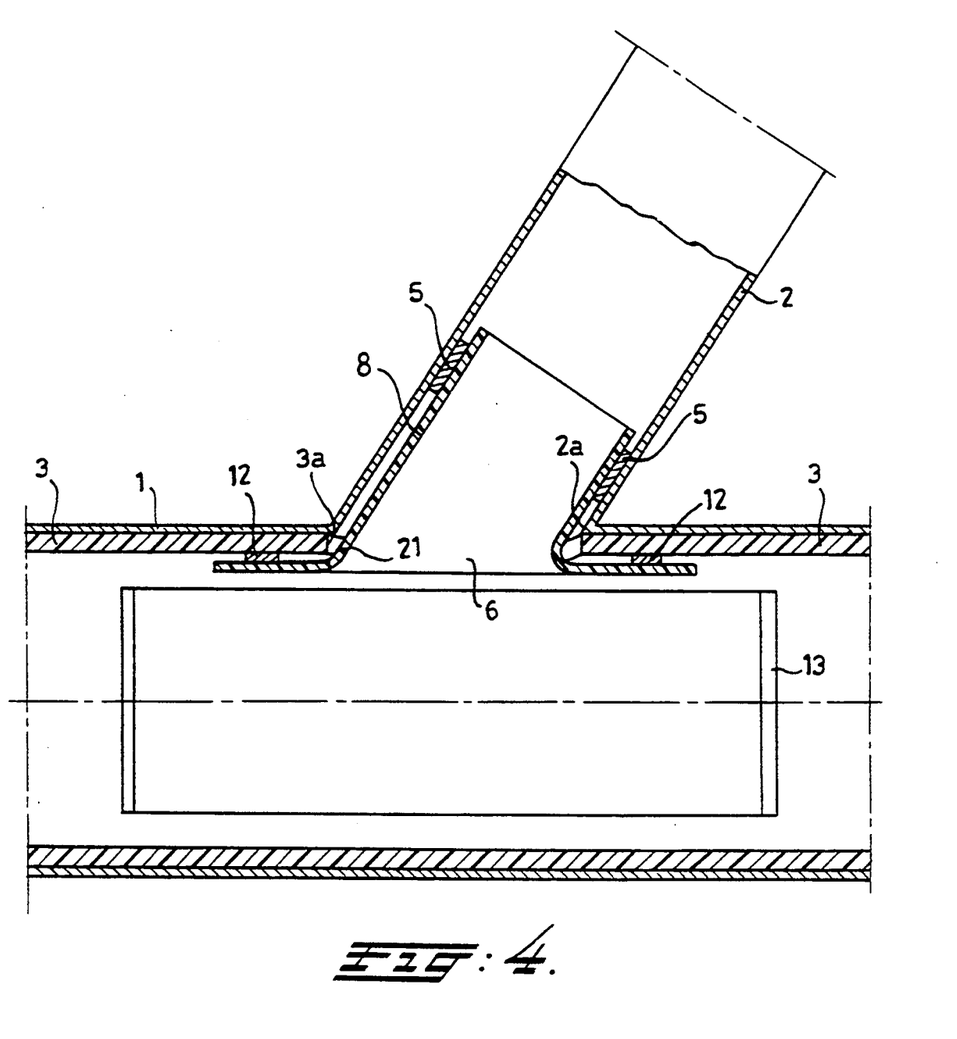
FIG. 4 shows the same section before the widening out of a fixing sleeve to form the connection according to FIG. 3.

As can be seen, the inner fixing sleeve 13 extends at both sides beyond the end of the saddle 6 (see FIG. 4).

Through widening of the inner fixing sleeve 13 (see FIG. 5), at least the end parts 14 and 15 of the inner fixing sleeve 13 are made to mate with the lining 3. In the absence of a lining, the end parts 14 and 15 will be made to mate with the inside wall of pipeline 1. A heatable, inflatable balloon may be used for widening the inner fixing sleeve 13.

Figure 5:
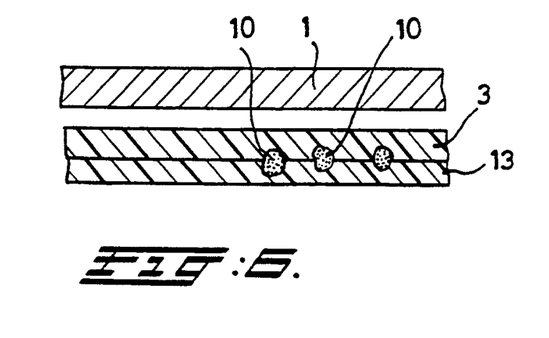
FIG. 5 shows a section of a variant of a pipeline according to FIG. 3.

In general, after accommodating the saddle, the branch 8 is also widened using such a heatable, inflatable balloon. In this way the branch 8 will be engaged very well to the inside of the branch pipe 2.

A seal 12 is present between lining 3 and saddle plate 6'.

A fixing material being harder than the plastic from which the inner fixing sleeve 13 and the lining 3 are made can expediently be present between lining 3 and inner fixing sleeve 13 at the point of mating between inner fixing sleeve 13 and inside of the lining 3.

It is particularly advantageous for this hard fixing material to be of carborundum granules 10. This means that, particularly in the case of smooth materials, such as polyolefins, in particular polyethylene, a very good fixing is ensured between widened inner fixing sleeve 13 and inside of lining 3, and no shifts can occur between the two mating parts. During the widening, the hard granules 10 penetrate not only into the lining 3, but also into the inner fixing sleeve 13, as a result of which the two parts subsequently can no longer shift (FIG. 6).

In a similar way, the hard granules can also be placed between lining 3 and outside of saddle plate 6', and/or between the outside of inner fixing sleeve 13 and inside of saddle plate 6'.

For good flexibility of the saddle, it is expediently provided with corrugations 24 which are pressed away during widening of inner fixing sleeve 13 if a slightly flexible saddle plate 6' is used (see FIG. 5).

As a saddle 6 of thermoplastic plastic is used, during widening of the inner fixing sleeve 13, if this takes place with the use of heat, the saddle plate 6' will also be heated and will thereby become softer and more flexible, so that the corrugations are even easier pressed away, and the saddle 6 will engage very well the inside of the lining 3.

The branch 8 of the saddle 6 is expediently also slightly flexible, so that corrugations present in the branch can be pressed away during widening.

The transition 25 between saddle plate 6' and branch 8 is expediently slightly flexible.

The saddle plate 6' preferably passes via a conical transition part 21 into branch 8, so that a local reduction in the diameter of branch 8 is prevented, and a greater diameter range of the branch 8 in a branch pipe 2 is possible. This also makes it easier to connect branch pipes not running at right angles to the pipeline.

Figure 1:
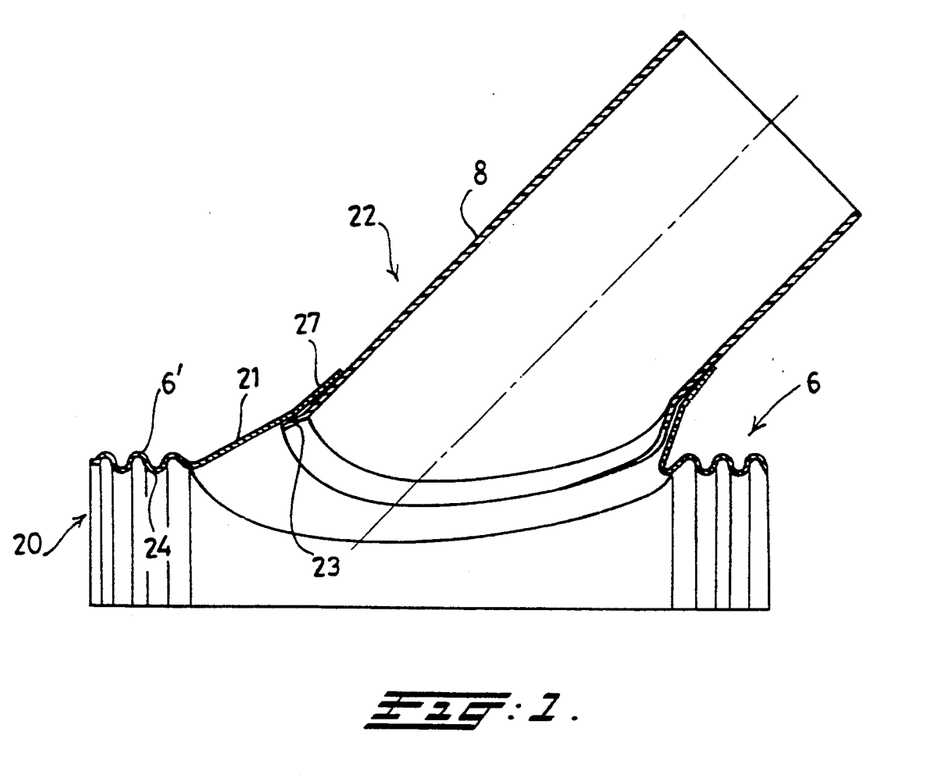
FIG. 1 shows a two-part saddle according to the invention as used in a repaired or renovated pipeline.
Figure 1A:
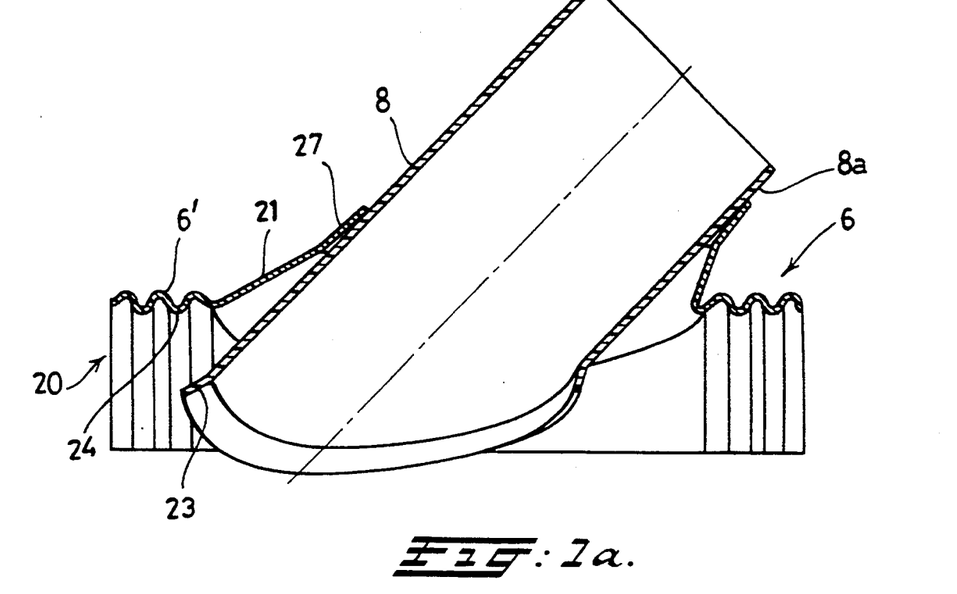
FIG. 1a a shows a saddle according to FIG. 1 in which the first and second saddle parts are shown separate from each other.

Such a plastic branch saddle is according to the invention preferably designed in two parts (see FIG. 1). The first saddle part 20 then comprises a saddle plate 6', on which an integral conical first connecting part 21 is formed. The second saddle part 22 comprises branch 8 and integral therewith a second connecting part 23 formed thereon. Connecting part 22 runs in the same conical manner as connecting part 21 and is accommodated in a detachable manner therein. Such a saddle with saddle parts 20 and 22 is easy to produce. In FIG. 1a it is shown that the second saddle part 22 has moved towards the direction of the saddle plate 6 of the first saddle part 10 so that during transport through a pipe line the branch 8 projects over a smaller length beyond the free end 21' of first connecting part 21 than the length of the branch 8 in its final accommodated position.

Such saddles 6 in two parts can be made up with a limited number of parts for a large number of combinations of diameters of the pipeline 1 and branch pipe 2. The two component parts 20 and 22 of a saddle 6 can be united by means of a snap-on connection, with the possibility of a seal between them, or by means of a glued connection. The use of a so-called hot melt adhesive is advantageous if the saddle is being heated during widening of the inner fixing sleeve 13 and/or of the branch 8. It is possible to insert a saddle 6 with further projecting branch 8 by introducing the two component saddle parts 20 and 22 in not yet fully united form, but slidable into each other, into the lining 3. This can also be desirable in particular in the case of a connecting branch pipe 2 which is not at right angles the pipeline 1.

Figure 2:
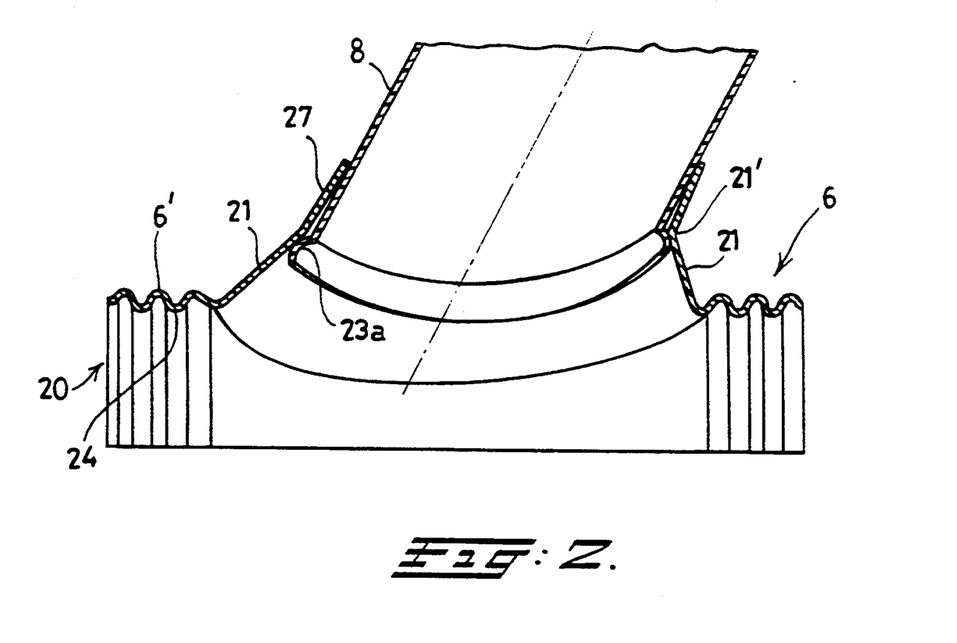
FIG. 2 shows a variant of a saddle according to FIG. 1.
Figure 3:
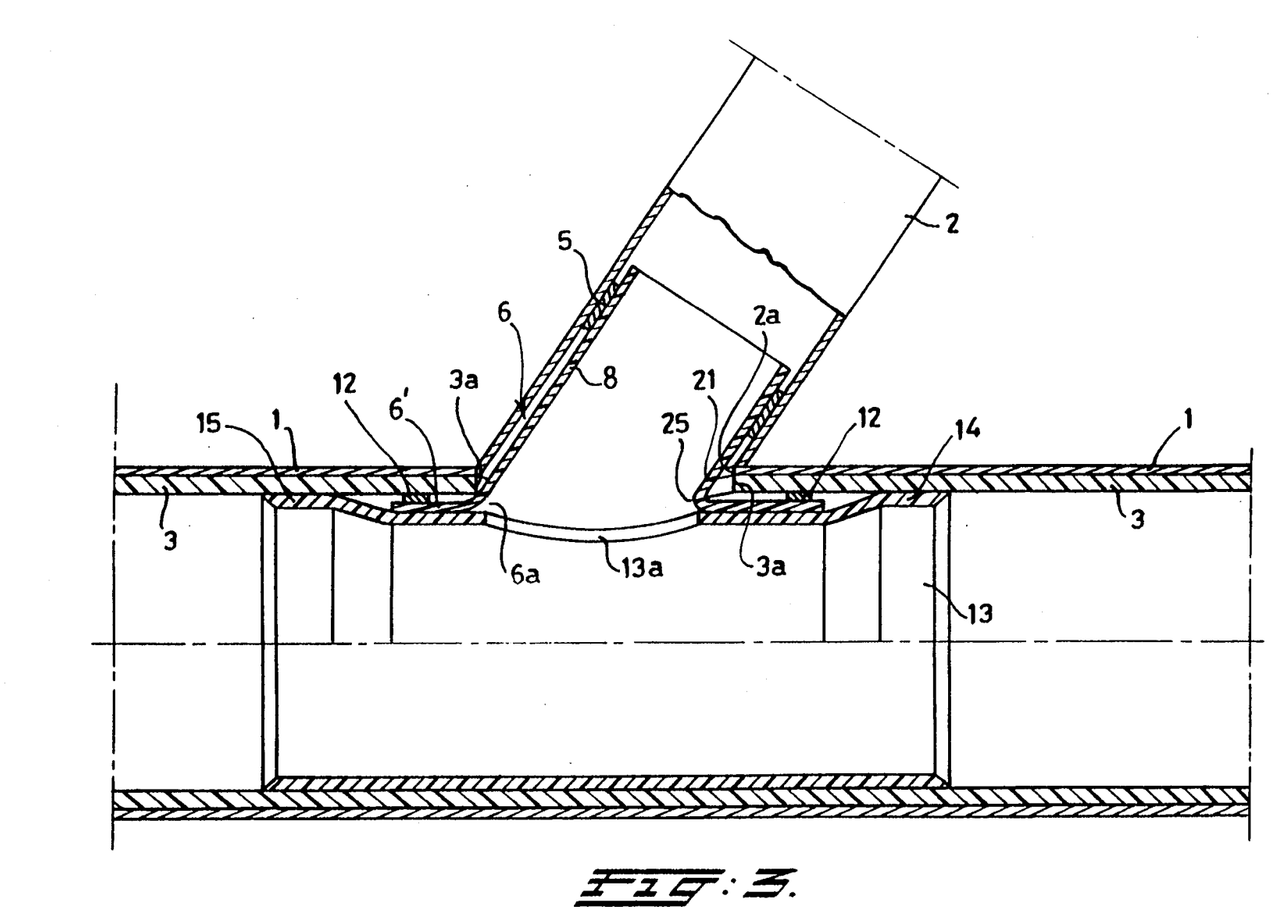
FIG. 3 shows a section of a repaired or renovated pipeline with branch pipe and branch connection and accommodated saddle according to the invention.

For a higher flexibility in the saddle according to FIG. 2 the first connecting part 21 tapers towards its free end 21' and the part 23 is provided with a circumferential spherical widening 23a. This allows a very good accommodation of the saddle and branch 8 in a branch pipe 2.

It will be obvious that due to the position and design of first connecting part 21 and second connecting part 23, 23a, branch 8 is retained in said first connecting part when the branch 8 is subjected to outward pulling forcing.

Thus connecting part 21 limits the projecting part of branch 8 in the accommodated state of the branch saddle.

Figure 7:
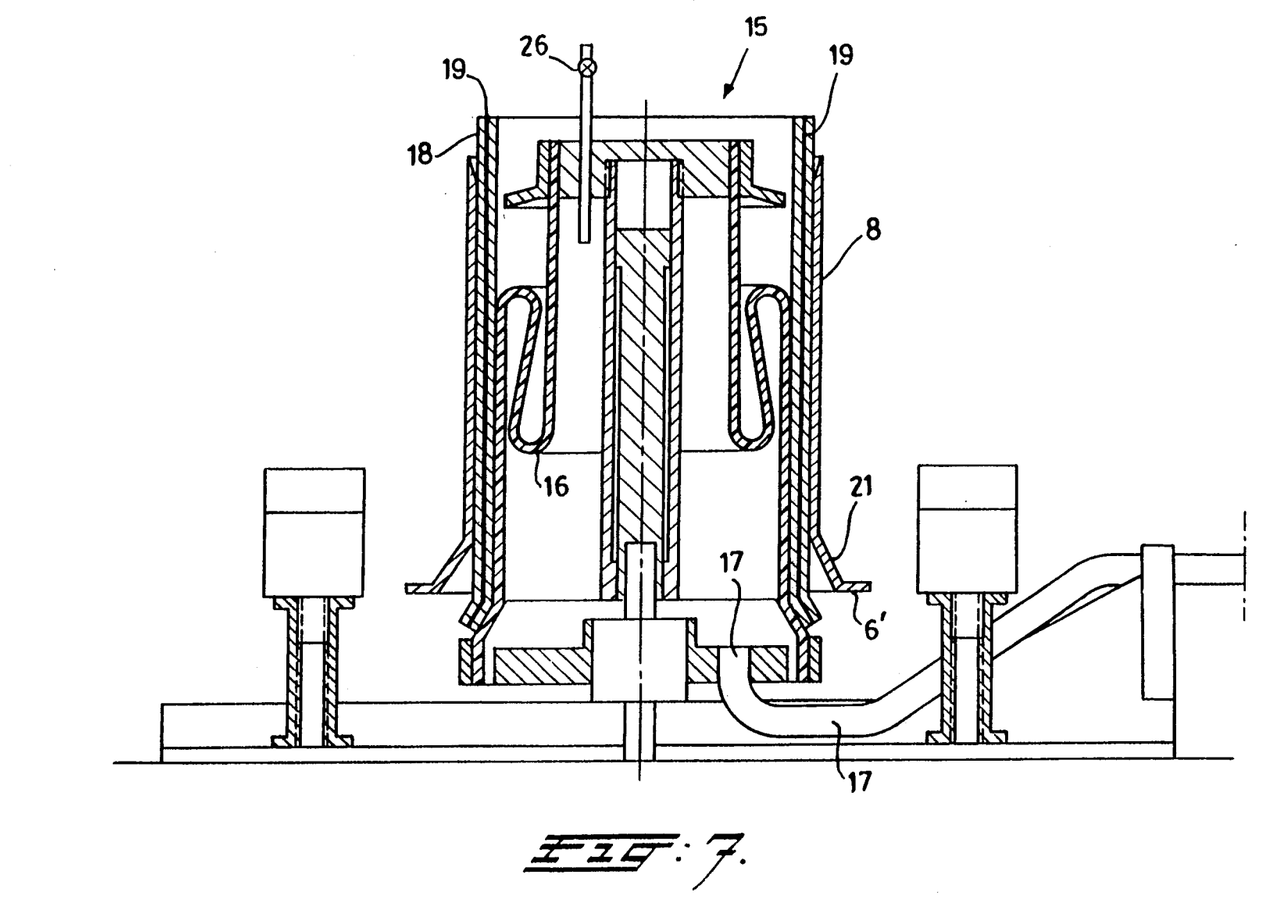
FIG. 7 shows an inflating element for widening a branch of a branch saddle.

FIG. 7, finally, shows an inflation device 15 provided with an inflatable balloon 16 which can be connected to a compressed air line 17. The balloon is surrounded by an electrically heatable silicone rubber sleeve 18 in which an electrical heating filament 19 is embedded. A branch 8 can hereby easily be widened. Such a device can, of course, also be used for widening inner fixing sleeve 13 until it rests against the inside wall of lining 3.

By means of excess pressure valve 26, it is possible, on reaching the set pressure in the balloon, to convey compressed air continuously through the balloon, so that the balloon is cooled down from the inside, and the procedure is speeded up.

As mentioned hereinbefore to prevent leakage through damage in a pipeline 1, a tubular lining 3 is fitted in the inside of the pipeline 1, so that sewage conveyed through the pipeline 1 can no longer penetrate into the surrounding ground through such damage.

For the insertion of such a tubular lining 3, this flexible lining can be introduced flat through a manhole into the pipeline and then expanded again to the desired tubular shape by heating.

Other methods are also possible, such as sliding in the tubular lining 3 in the rigid, round shape, while the space then formed between the inside of the pipeline and the newly inserted lining has to be filled up after the branch is fitted. Suitable materials for the lining are in particular thermoplastic plastics such as polyethylene and polyvinyl chloride, but thermosetting plastics, such as fibre-reinforced polyester, can also be used. The choice is not, however, limited to these materials.

Figure 8:
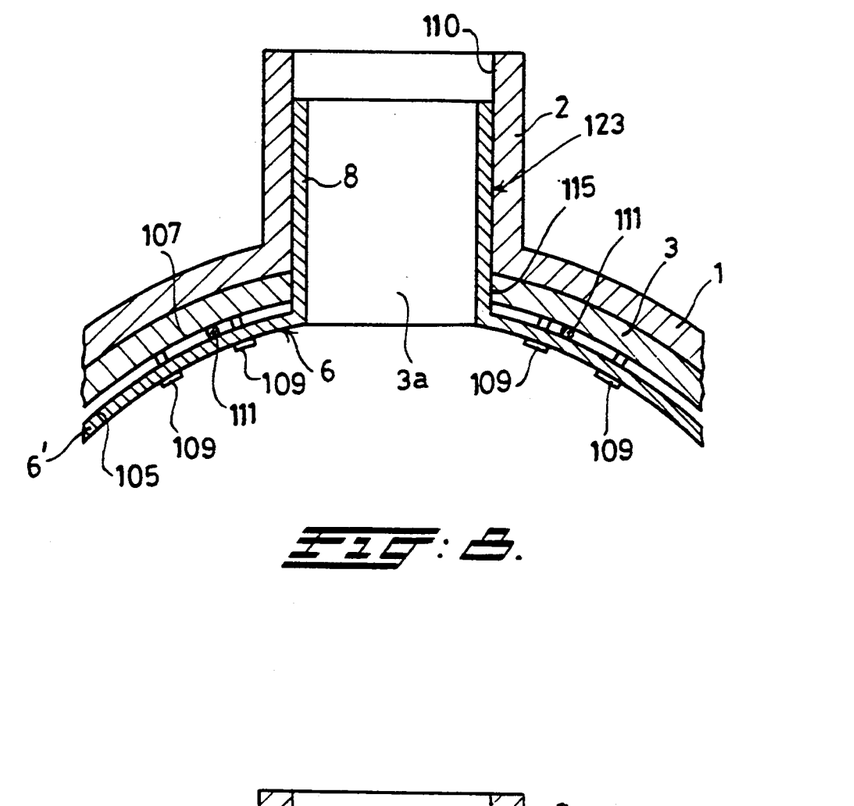
FIG. 8 shows a pipeline 1, for example a concrete sewer pipe, with a branch pipe 2 firmly connected thereto.

At a branch pipe 2 the tubular lining 3 is provided with a bore 3a by a robot (FIG. 8).

The external surface 105 of a branch saddle 6 fitted from the inside 115 of the pipeline 1 lies opposite the inner side 107 of the lining 3, while the branch 8 of branch saddle 6 extends through the bore 3a into the branch pipe 2. Fitted between the outer side 105 of branch saddle plate 6' and inner side 107 of tubular lining 3 is a seal 111 of elastic material, in particular elastic material swelling under the influence of water. It goes without saying that a foamable rubber compound, which after fitting is foamed using heating means, can also be used for these.

Figure 9:
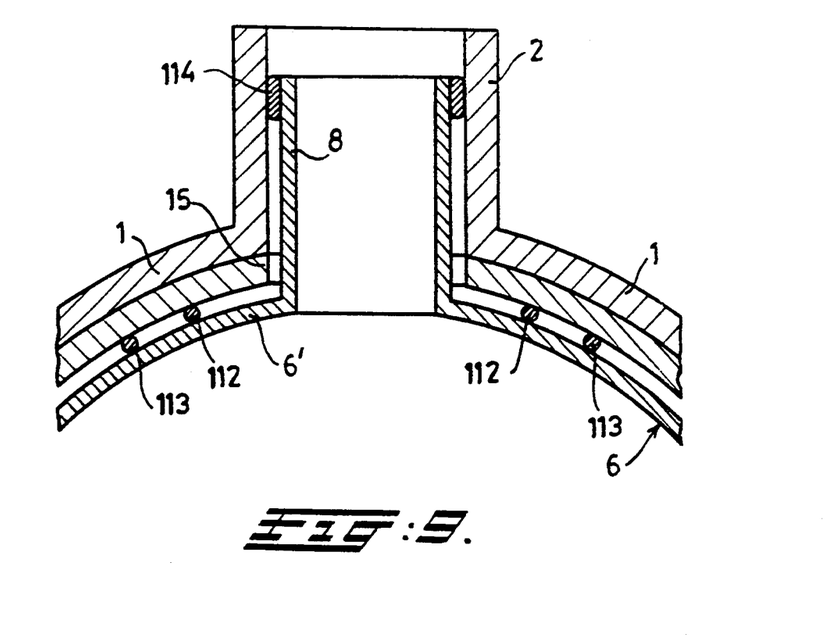
FIG. 9 shows a section of another embodiment of a pipeline with branch pipe and branch connection according to the invention.

Thermal/mechanical fixing means 109 are present for fixing the branch saddle 6, such as nails, rivets, screws possibly with barbs, which are pre-heated if necessary for a better penetration into the lining 3. This is preferable in particular in the case of polyethylene, more so than in the case of polyvinyl chloride. According to a very advantageous embodiment, the fixing means are combined with sealing means to a welded connection 12 or a glued connection 113 (FIG. 9).

In cases where it is not entirely sure that the welded connection 112 or glued connection 113 can guarantee a complete seal all the way round, use of separate sealing means 111 is advantageous.

Figure 10:
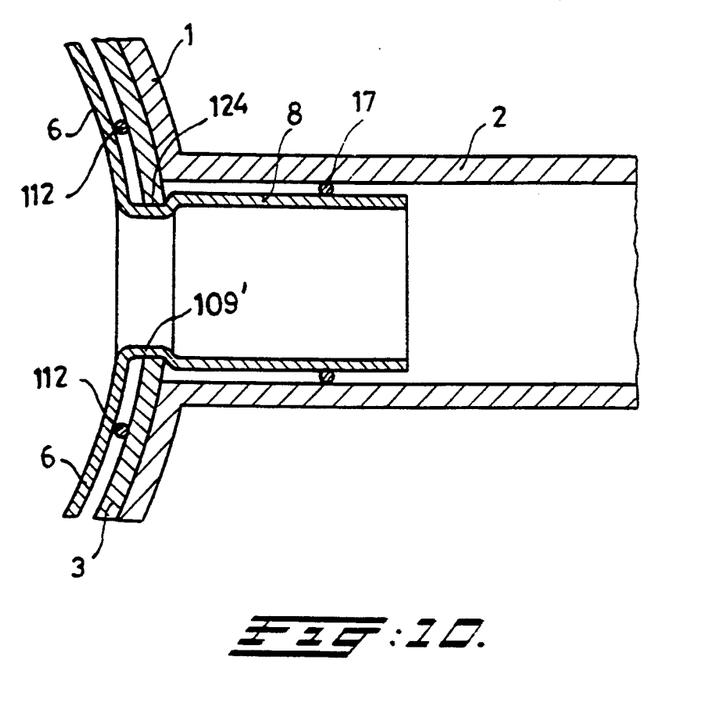
FIG. 10 shows a variant of another branch connection.

Instead of a thermal/mechanical connection 109, it is also possible to fix the branch 8 by means of a snap-on connection 109' between the edge 124 of the opening in lining 3 and branch 8 of the branch saddle. In any case the opening in the lining 3 must in this case be smaller than in the pipeline 1 (FIG. 10).

It goes without saying that the saddle can also be fixed by means of a mechanical connection to the inner side of the branch pipe, for example by means of steel teeth with barbs or a clamping connection with conically divided clamping ring.

A very suitable seal between the branch saddle and the branch pipe can be obtained by shrinking the branch 8 in diameter before insertion and by heating it after insertion, so that as a result of the thermoplastic memory of thermoplastic plastics the branch 8 will resume its original shape with the inner side wall 10 of branch pipe 2 mating in clamping fashion with outer wall 123 of branch 8 (FIG. 8).

At the transition from the branch 8 to the inner side of the branch pipe 2, which may or may not also be provided with a tubular lining 3, it is advisable to obtain a smooth transition, in order to prevent as far as possible caking and possible obstructions of such branch pipes, particularly in the case of sewer pipes.

Sealing with only a rubber sealing ring is possible, but it is less attractive, since one is restricted to one size of rubber ring, while slight variations of the internal diameter of the branch pipe still have to be met, so that very many designs of the branch saddle 6 with different diameters of branch 8 would be necessary. Besides, a ring of relatively large dimensions is always necessary, which leads to little flexibility and to too great a diameter reduction between branch pipe 2 and branch 8.

In order to obtain a good smooth transition, the space between the outside of the branch 8 and the inner side wall 110 of the branch pipe 2 can be foamed full of foam plastic material 114 (FIG. 9).

Figure 12:
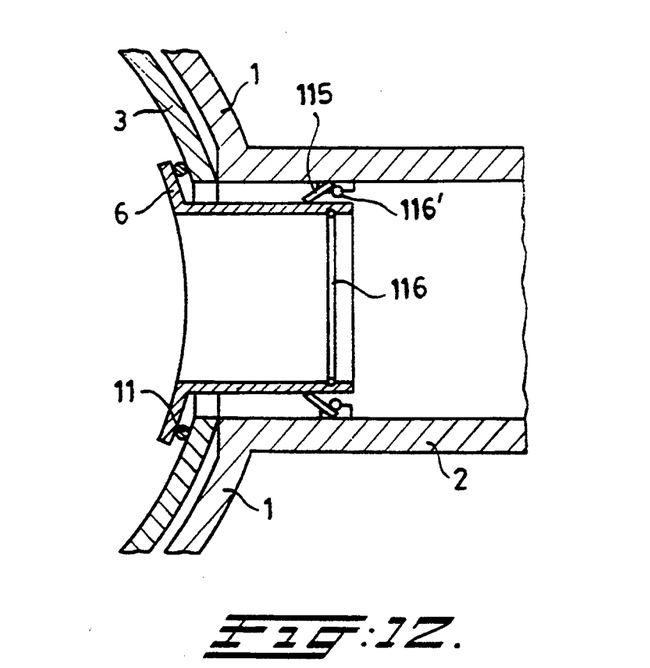
FIGS. 12, 13, 14, 15, 16, 17, 18 and 19 show different variants of the seal between the branch of a branch saddle and the inner side of a branch pipe or the lining of a branch pipe.

It is, however, also advantageous (see FIG. 12) to make use of a rubber seal initially held in a compressed state by an expandable clamping ring 116, said ring 116 being made to expand to the state 116' after the insertion of the saddle, so that the rubber seal 115 is pressed against the inner side wall of the branch pipe 2. The clamping ring 116 can be, for example, a tensioned spring-loaded element (such as a spring) which is released mechanically or electrically through melting of a soldered joint.

Figure 13:
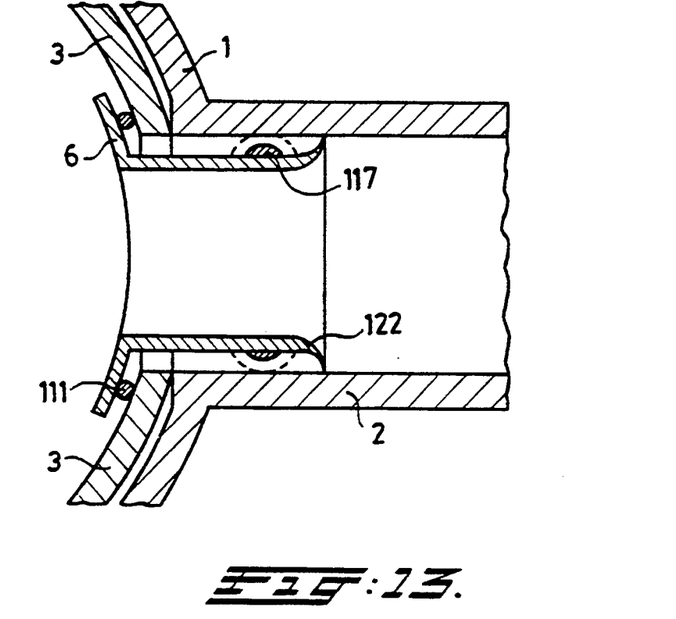

It is also particularly advantageous to use a branch with good flow profile 122 and water-swellable rubber ring 117 for the seal (see FIG. 13), so that a greater diameter range with a certain branch saddle 6 is possible. In addition, plays can be absorbed well in this way.

Figure 11:
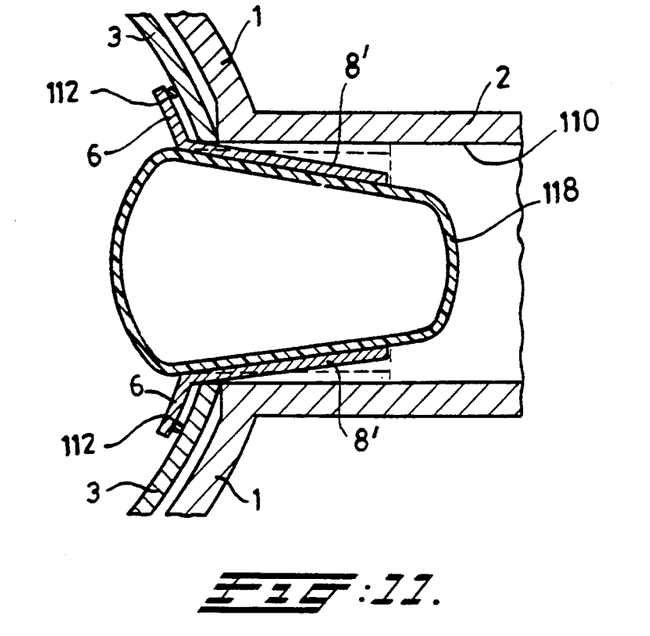
FIG. 11 shows another embodiment of a pipeline according to the invention.

For obtaining a good smooth transition and good seal and fastening of the end of branch 8 to the inner side 110 of the branch pipe 2, it is also possible to use a possibly tapering branch 8' which after fitting is widened with a balloon 118 with pressure medium (see FIG. 11) until the widened branch 8 rests against the inner wall 110 of branch pipe 2. During widening branch 8' is, of course, heated in situ, for example with an electrically conducting inbuilt element, or with an electrically conducting plastic or the like.

Figure 14:
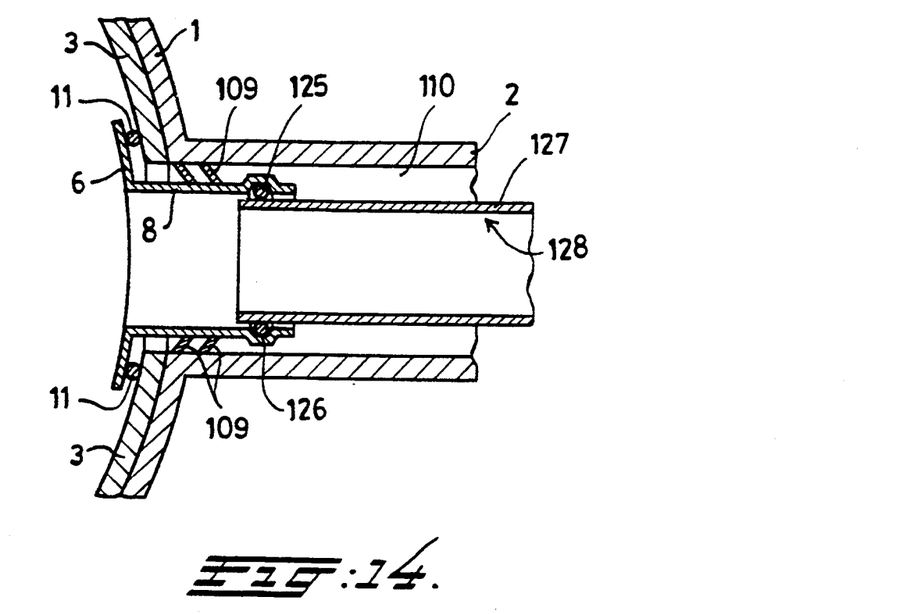

FIG. 14 shows yet another embodiment, in which a rubber ring 125 in a groove 126 in the branch 8 seals on the outer wall 127 of a smooth, loose-lying lining 128 in the branch pipe 2. A connection between branch 8 and lining 3 is also possible by means of a shrunk-on sleeve.

The saddle 6 is fixed here by one or more teeth 109 which are firmly connected to the branch 8, and which rest against the inner wall 110 of branch pipe 2 and prevent the saddle 6 from retracting.

Figure 15:
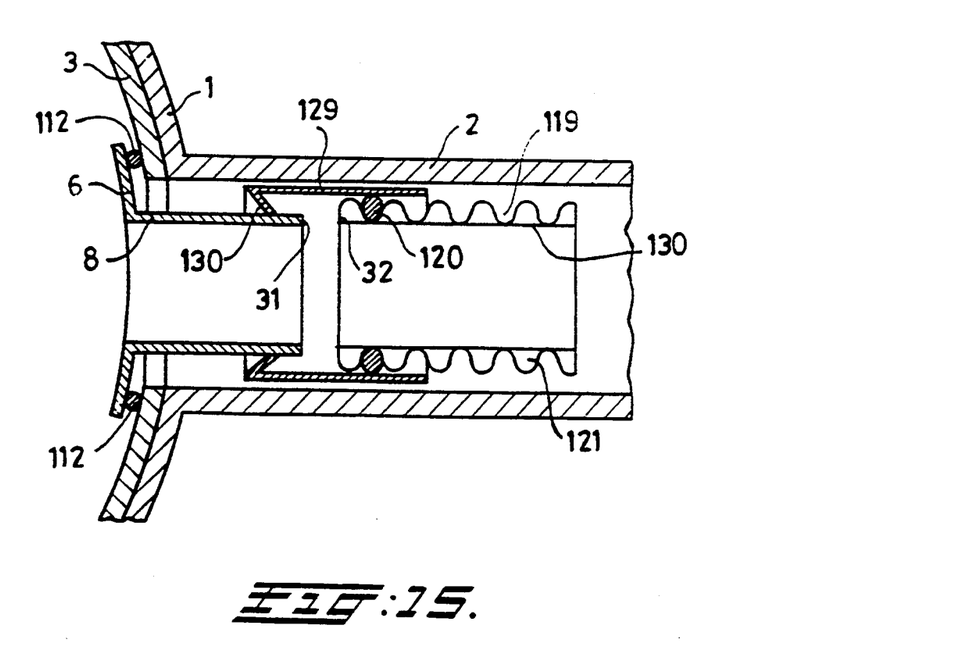

Finally, FIG. 15 shows a particularly advantageous embodiment.

In this case the branch pipe 2 is provided with a lining 130 in the form of a corrugated pipe with ribs 121 and external grooves 119. A sealing ring 120, mating in a sealing manner with a sleeve 129, is provided in a groove 119. The end of the sleeve 129 is provided with sealing means 130 engaging the branch 8 of saddle 6. The sleeve 129 can be fixed on the lining 130, for example by means of a snap-on connection. The fixing of saddle 6 can again take place by means of, for example, a welded joint 112, or with teeth in the branch pipe or the like. This variant has the advantage that the internal diameters of lining 130 and branch 8 can be virtually the same as regards flow advantages, and the external diameter of branch 8 is as small as possible, so that the opening after lining 3 in the pipeline 1 is as small as possible, and saddle 6 can also be inserted easily. The lining 130 complete with sleeve 129 will in this case generally be inserted into the branch pipe 2, whereafter the saddle 6 is fitted.

Figure 16:
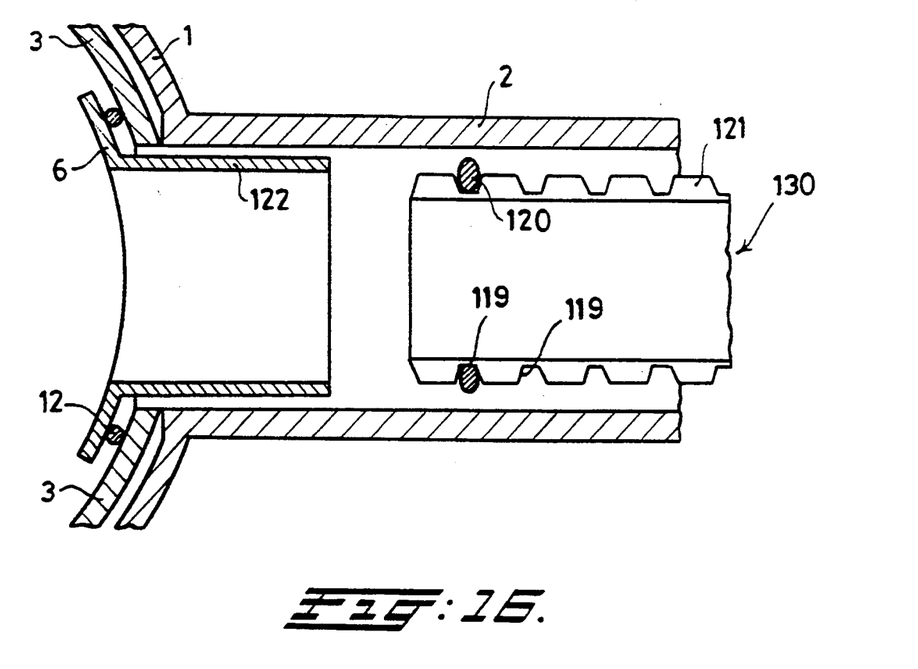

FIG. 16 shows yet another embodiment, in which a lining 130 in the form of a corrugated pipe with ribs 21 and external grooves 119 is placed in the branch pipe 2. A sealing ring 120, being able to engage the inner wall 122 of branch 8 in a sealing manner is provided in a groove 119.

The examples all show a connection at an angle of 90° between pipeline 1 and branch pipe 2, but it is clear that connections at other angles, for example at an angle of 45°, are also possible.

Figure 17:
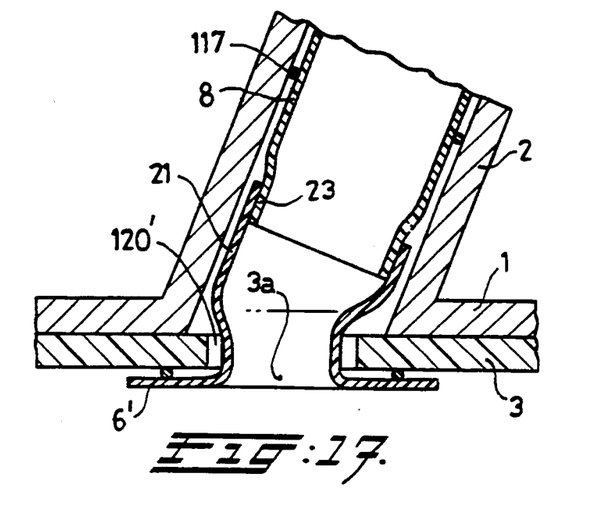

FIG. 17 shows a sealing 120' between the edge 124 of the opening 3a in lining 3 apart from sealing 117 engaging the inner wall of branch pipe 2 and the outer wall of branch 8.

Figure 18:
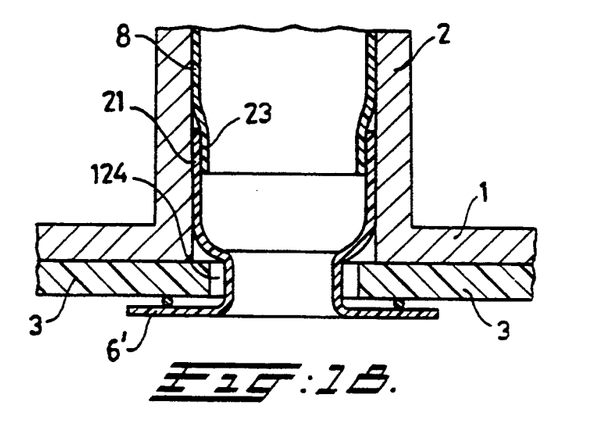

FIG. 18 shows the final position of the saddle with connecting part 21 deformed around the edge 124 of the opening in liner 3. The liner 3 is provided with a liner opening being somewhat smaller than the diameter of branch pipe 2. In this way it is not necessary to fix the saddle 6.

Figure 19:
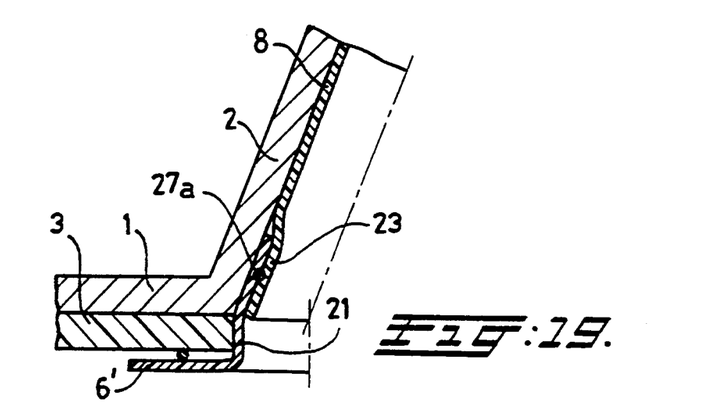

At last FIG. 19 shows that the two parts 21 and 23 of a saddle are interconnected by a sealing ring 23a.

For reasons of simplicity in FIGS. 3 to 16 the saddle is shown in the form of one part, but it will be obvious that these embodiments remain the same with a saddle as shown in FIG. 1.

On the other hand it should be noted that all novel features as presented in FIGS. 2 to 6 and 8 to 16 may be used with either a saddle in one part or a saddle in two parts.

It will be obvious that in all cases the branch pipe 2 may be provided with a plastic liner before accommodating the saddle 6.

Particularly important is also a good gradual transition between branch 8 and branch pipe 2 in order to avoid disturbances.

Suitable thermoplastics for the saddle 6 are polyvinylchloride or a polyolefin such as polyethylene.

We claim:

1. In a pipeline to be repaired or renovated, the pipeline having at least one branch pipe connected therewith and communicating with the interior of the pipeline through a branch opening in the pipeline, a branch saddle (6) of thermoplastic material comprising:
   a branch saddle plate (6') and
   a branch saddle portion, said saddle portion being divided into a first saddle part (20) and a second saddle part (22),
   said branch saddle plate (6') being integral with said first saddle part (20), said first and second saddle parts (20, 22) being movable with respect to each other and said movable first and second saddle parts (20, 22) forming a projecting length of said branch saddle, said movability of the first and second saddle parts (20, 22) allowing transport of said saddle comprising said first and second saddle parts through the pipeline with a decreased projecting length of said branch saddle in comparison with the projecting length of said branch saddle in its final accommodated state and the combination of said first and second saddle parts (20, 22) to be accommodated from the inner side of the pipeline through the branch opening into the branch pipe.

2. Branch saddle according to claim 1, wherein said first saddle part (20) comprises said saddle plate (6') formed integral therewith with a connecting saddle part and wherein said second saddle part (22) comprises a branch (8) being inwardly and outwardly movable in said connecting saddle part (21).

3. Branch saddle according to claim 1, wherein said connecting saddle part (21) is conical.

4. Branch saddle according to claim 1, wherein the transition between the saddle plate (6') and connecting saddle part (21) is selected from the group of connections consisting of inflexible connections and flexible connections and the saddle plate is flexible.

5. Branch saddle according to claim 1, wherein the saddle plate (6') is corrugated and the branch and the connecting saddle part are each selected from the group of materials consisting of ribbed materials and flexible materials.

6. Branch saddle according to claim 1, wherein said saddle plate (6') with an integral connecting saddle part (21) which is conical forms said first saddle part, and said second saddle part comprises said branch (8) having formed thereon a second conical connecting saddle part (23) being movably accommodated in said first conical connecting saddle part (21) and provided with means for sealingly interconnecting said first connecting saddle part (21) and second connecting saddle part (23).

7. Branch saddle according to claim 6, wherein said second connecting saddle part (23) is curved (23a) and the first connecting saddle part (21) engaging said curved second saddle part (23a) conically narrows (21') towards a free end thereof.

* * * * *